(12) United States Patent
Liu et al.

(10) Patent No.: US 9,602,526 B2
(45) Date of Patent: Mar. 21, 2017

(54) USER LOGIN MONITORING DEVICE AND METHOD

(71) Applicant: BEIJING QIHOO TECHNOLOGY COMPANY LIMITED, Beijing (CN)

(72) Inventors: Fei Liu, Beijing (CN); Wei He, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/647,338

(22) PCT Filed: Sep. 22, 2013

(86) PCT No.: PCT/CN2013/083936
§ 371 (c)(1),
(2) Date: May 26, 2015

(87) PCT Pub. No.: WO2014/082484
PCT Pub. Date: Jun. 5, 2014

(65) Prior Publication Data
US 2015/0326595 A1    Nov. 12, 2015

(30) Foreign Application Priority Data
Nov. 29, 2012 (CN) .......................... 2012 1 0500724

(51) Int. Cl.
*G08B 23/00* (2006.01)
*H04L 29/06* (2006.01)
(Continued)

(52) U.S. Cl.
CPC ........ *H04L 63/1425* (2013.01); *H04L 63/107* (2013.01); *H04L 63/20* (2013.01); *H04W 12/12* (2013.01); *H04W 4/021* (2013.01)

(58) Field of Classification Search
CPC ....... H04L 67/24; H04L 63/107; H04L 67/22; H04L 63/1425; H04L 63/20; H04W 4/021; H04W 412/12
(Continued)

(56) References Cited

U.S. PATENT DOCUMENTS

2008/0222706 A1* 9/2008 Renaud ............... H04L 63/1408
726/4
2010/0094767 A1* 4/2010 Miltonberger ....... G06Q 10/067
705/325

(Continued)

OTHER PUBLICATIONS

Liu, F. et al., English abstract only of Chinese application No. CN102045634A, User safety control method and device based on geographical position abnormality of mobile terminal, publication date May 4, 2011, one page.

(Continued)

*Primary Examiner* — Brian Shaw
(74) *Attorney, Agent, or Firm* — Baker & Hostetler LLP

(57) ABSTRACT

The present invention discloses a user login monitoring device and method. The method comprises: acquiring a latest user login record list of a user, wherein each of the user login records comprises information associated with the login location of the user; determining a frequently-used login location of the user according to the user login record list, and when the number of the user login records with a same login location is not less than a first threshold, determining the login location as the frequently-used login location of the user; and marking a user login record with a different login location from the frequently-used login location as abnormal. The frequently-used login location of the user can be automatically determined without the participation of the user, and the abnormal login record can be determined and marked by using the present invention so as to facilitate the user to check or remind the user, thus the (Continued)

security of the user account is improved. Moreover, in some special cases, it can be determined accurately whether a user login is abnormal according to the present invention, thus the accuracy is increased and the false alarm rate is lowered.

15 Claims, 4 Drawing Sheets

(51) Int. Cl.
*H04W 12/12* (2009.01)
*H04W 4/02* (2009.01)

(58) Field of Classification Search
USPC .......................................................... 726/22
See application file for complete search history.

(56) References Cited

U.S. PATENT DOCUMENTS

| | | | |
|---|---|---|---|
| 2010/0211997 A1* | 8/2010 | McGeehan | G06F 21/316 726/4 |
| 2011/0010590 A1 | 1/2011 | Varadarajan | |
| 2013/0055370 A1* | 2/2013 | Goldberg | G06F 21/31 726/7 |

OTHER PUBLICATIONS

Hou, K. et al., English abstract only of Chinese application No. CN102325062A, Abnormal login detecting method and device, publication date Jan. 18, 2012, one page.
International Search Report regarding PCT/CN2013/083936, issued Dec. 26, 2013, 2 pages.

\* cited by examiner

USER LOGIN MONITORING DEVICE AND METHOD

FIELD OF THE INVENTION

The present invention relates to the technical field of the Internet, and in particular to a user login monitoring device and method.

BACKGROUND OF THE INVENTION

With the rapid development of the Internet, more and more network applications with a large number of users appear. Generally, a user has to log on to the network application system before using more complete functions of the network application.

Moreover, the forms of the network client become more and more diversified. In addition to traditional PC client and web interface, the client of the network application also includes mobile clients such as smartphones and tablets. The user can use any kind of client to log on to the network application, and perform substantially the same functions.

The user can log on to the network application system at any time in any place due to the characteristics of Internet application. Some malicious people may steal the information of a normal user after stealing the password of the user and then logging on to the network application system in other places, thereby causing serious losses to the user. Therefore, the security of the user account can be effectively improved by monitoring the login information of the user so as to find out the potential abnormal login as timely and accurately as possible.

SUMMARY OF THE INVENTION

In view of the above problem, the present invention is proposed to provide a user login monitoring device and a corresponding method for overcoming the above problem or at least partially solving the above problem.

According to an aspect of the present invention, a user login monitoring device is provided, and the device includes:

a login record fetcher configured to acquire a latest user login record list of a user, wherein the user login record list includes a first predetermined number of user login records, and each of the user login record includes information associated with the login location of the user;

a frequently-used login location determiner configured to determine a frequently-used login location of the user according to the acquired user login record list, wherein user login records with a same login location in the use login record list are collected and analyzed statistically, and in a case that the number of the user login records with the same login location is not less than a first threshold, the login location associated with the user login record with the same login location is determined as the frequently-used login location of the user; and an abnormal login record marker configured to mark a user login record with a different login location from the frequently-used login location as abnormal.

According to another aspect of the present invention, a user login monitoring method is provided, including steps of:

acquiring a latest user login record list of a user, wherein the user login record list includes a first predetermined number of the user login records, and each of the user login records includes information associated with a login location of the user;

determining a frequently-used login location of the user according to the acquired user login record list, wherein user login records with a same login location in the user login record list are collected and analyzed statistically, and in a case that the number of the user login records with the same login location is not less than a first threshold, the login location associated with the user login record with the same login location is determined as the frequently-used login location of the user; and marking a user login record with a different login location from the frequently-used login location as abnormal.

According to the user login monitoring device and method provided by the present invention, the frequently-used login location of the user may be automatically determined without the participation of the user, and the abnormal login record is determined and marked according to the frequently-used login location so as to facilitate the user to check or remind the user, thereby improving the security of the user account. In addition, in special cases such as when a user is on a business travel or a tour or uses a specific network, the user login monitoring device and method of the present invention can also accurately determine whether the user login is abnormal so as to enhance the accuracy and reduce the false alarm rate.

The above description is only an overview of the technical solution of the present invention. In order to enable a clearer understanding of the technical means of the present invention so that it may be implemented in accordance with the content of the description, and in order to make the aforementioned and other objects, features, and advantages of the present invention be more apparent and easy to understand, the embodiments of the present invention are described in detail below.

BRIEF DESCRIPTION OF THE DRAWINGS

Various other advantages and benefits are clear for those of ordinary skill in the art by reading the following detailed descriptions of preferred embodiments. The drawings are only intended to illustrate the preferred embodiments, and are not interpreted as limiting the present invention. Moreover, in all the drawings, the same components are indicated by the same reference symbols. In the drawings.

DETAILED DESCRIPTION OF THE EMBODIMENTS

The exemplary embodiments of the present disclosure will be further described below with reference to the accompanying drawings. Although the accompanying drawings show exemplary embodiments of the present disclosure, it should be understood that the present disclosure may be implemented in various forms and should not be limited by the embodiments described herein. In contrary, these embodiments are set forth in order to provide a more thorough understanding of the present disclosure, and the scope of the present disclosure can be fully conveyed to those skilled in the art.

Figure 1:
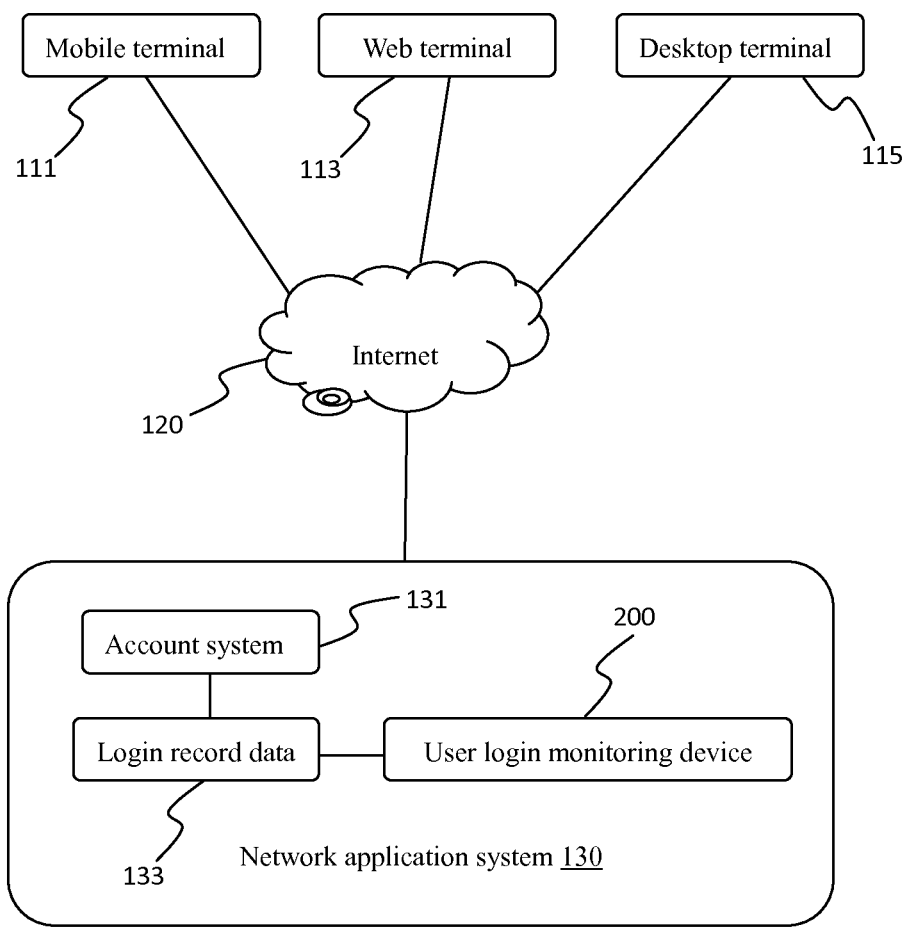
FIG. 1 schematically shows a typical application of the user login monitoring device and method of the present invention.

FIG. 1 schematically shows a typical application of a user login monitoring device and method of the present invention. As shown in FIG. 1, a user can log on to a desired network application system 130 via the Internet 120 by means of various suitable terminals, such as a mobile terminal 111, a Web terminal 113 or a desktop terminal 115 to use a variety of functions provided by the network application system 130. Such a network application system 130 may, for example, be an email system, an online storage system, a forum, an online bank, an online game, an online shopping mall or the like. In order to distinguish different user identities or for other reasons, these network application systems usually require the user to register and obtain a login account and password corresponding to the user, and also requires the user to provide some relevant information such as the real identity information, address, registration place and the like during the user's registration. Accordingly, such a network application system will usually provide an account system 131 to complete the registration of the user login account, and to verify the correctness of a user's login account, password and other optional information when he logs on to the network application system. The successfully verified user can use various functions provided by the network application system.

In addition, the account system 131 may also be responsible for recording login record data 133 of the user. The login record data may, for example, include login time, login IP, optional behavior type after login and the like. The behaviors after login may include changing the password, resetting the password, modifying the security mailbox address, modifying the security mobile phone number, modifying the security question, modifying personal information and the like. These login record data can be stored in the network application system in a form of login record list.

If some malicious people have stolen the login account and password of a normal user, he can unlawfully acquire the user registration information by logging on to the network application system, and even pretend to be a normal user to use various functions of the network application system, thereby causing losses to the user.

Although the user can often log on to the network application system 130, see if there is an abnormal login record by reading the login record data 133, and then protect the account security by modifying the login password and other means, these are obviously very energy consuming and inconvenient for ordinary users.

By analyzing the login record data 133 recorded by the network application system, the user login monitoring device 200 of the present invention automatically determines and marks the abnormal login record without the participation of the user. In this way, the user may focus on these abnormal login records after logging in on the one hand. On the other hand, the user also may be informed by a variety of communication means when abnormal login record appears, so that the user takes corresponding measures timely to avoid losses or the expansion of losses. In one embodiment, the user login monitoring device 200 of the present invention can be implemented in a form of being embedded in the network application system 130.

The basic idea of the user login monitoring device and method of the present invention is as follows: determining the usual (i.e. frequently-used) login location of the normal user, and determining the behavior of login from an unusual login location as abnormal. It should be understood that the login location here refers to an actual geographical area, rather than simply an IP address, and a plurality of different IP addresses will exist for a same login location. For example, the unit of the login location may be taken as 'district', 'county', 'city' or the like which is divided in terms of administrative area. Certainly, a larger and smaller geographical area can also be taken, as long as each unit area in the divided areas does not overlap substantially with one another. Each divided geographical area corresponds to a login location. When the accuracy of the IP address mapping database for reflecting the relationship between the IP address and the login location at present, and the conventional migration characteristics of normal users are taken into account, the 'city' divided as an administrative area (including 'prefecture-level city' and 'municipality directly under the central government') is taken preferably as the unit of the login location.

Figure 2:
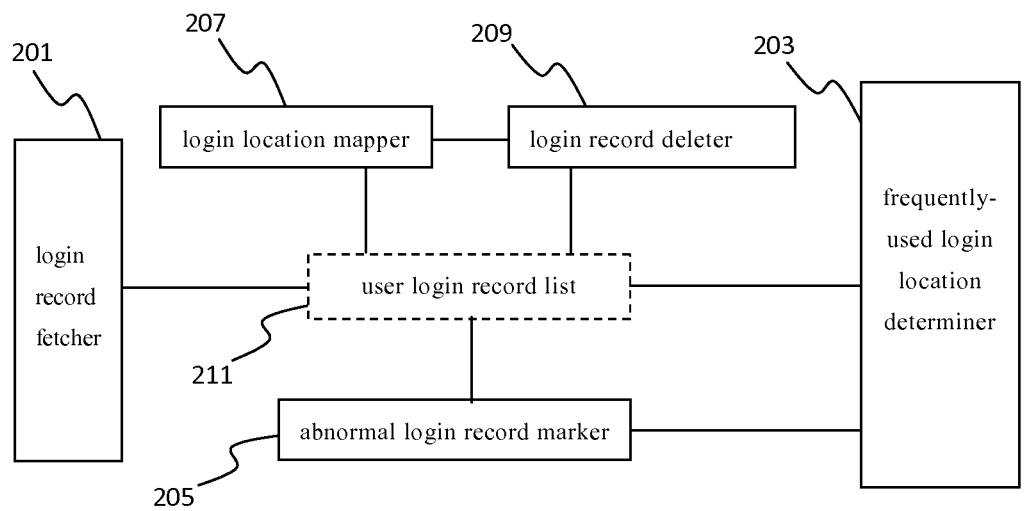
FIG. 2 schematically shows a structural diagram of an embodiment of the user login monitoring device according to the present invention.

FIG. 2 schematically shows an embodiment of the user login monitoring device according to the present invention. The user login monitoring device 200 may include a login record fetcher 201, a frequently-used login location determiner 203, an abnormal login record marker 205, and optionally a login location mapper 207 and a login record deleter 209.

The login record fetcher 201 is used for acquiring the latest user login record list 211 of the user. The user login record list 211 includes a first predetermined number of user login records, and each user login record includes information associated with the login location of the user. For example, in the scene shown in FIG. 1, the login record fetcher 201 may obtain the desired user login record list 211 from the login record data 133 recorded by the account system 131. Here, the latest user login record list is preferably the first predetermined number of the user login records which are taken in a forward sequence, starting from the moment that the login record fetcher 201 performs the acquisition operation. In an exemplary embodiment, the first predetermined number may be selected as 10.

The information associated with the login location of the user in the user login record may be the IP address used when the user logs in. The login location mapper 207 may be used for mapping the IP address as the login location of the user. In one embodiment, the login location mapper 207 can use the IP address mapping database to complete the mapping operation from the IP address to the login location. In some cases, for example, when a user logs in through a virtual private network (VPN), the login location mapper 207 is possibly unable to map the IP address as the login location of the user, and then the login location mapper 207 may set the login location of the user to be 'unknown'. In some cases, for example, the network application system 130 as shown in FIG. 1 has determined the login location of the user by means of the IP address mapping database or in other modes, and recorded it in the login record data 133. Thus, what is contained in the user login record acquired by the login record fetcher 201 from the login record data 133 is just a login location, so the login location mapper 207 may be omitted in the user login monitoring device 200. Table 1 shows one exemplary embodiment of the user login record list 211, wherein a corresponding login location has been obtained by mapping to the IP address mapping in the column of 'login location'. In addition, the user login record list also optionally provides a login time and operation which the user can perform to the login record.

TABLE 1

| Login Location | Login Time | Operation |
|---|---|---|
| Beijing (125.33.50.*) | 2012-07-04 10:52:24 | Ignoring this record |
| Unknown | 2012-07-04 14:22:22 | Ignoring this record |
| Changsha (220.240.88.*) | 2012-07-04 22:01:00 | Ignoring this record |
| Beijing (111.193.195.*) | 2012-07-05 09:12:02 | Ignoring this record |
| Baoding (101.7.243.*) | 2012-07-06 10:17:19 | Ignoring this record |
| Baoding (101.7.243.*) | 2012-07-06 11:08:58 | Ignoring this record |
| Baoding (101.7.243.*) | 2012-07-06 17:01:29 | Ignoring this record |
| Beijing (125.33.50.*) | 2012-07-08 09:32:55 | Ignoring this record |
| Beijing (125.33.50.*) | 2012-07-08 10:13:37 | Ignoring this record |
| Beijing (125.33.50.*) | 2012-07-08 13:43:34 | Ignoring this record |

The frequently-used login location determiner 203 may determine the frequently-used login location of the user according to the acquired user login record list 211. In operation, the user login records with the same login location in the user login record list 211 may be collected and analyzed statistically by the frequently-used login location determiner 203, and when the number of the user login records with the same login location is not less than a first threshold, the login location associated with the user login records is determined as the frequently-used login location of the user. In one embodiment, the first threshold may be set to be about 30% of the first predetermined number. For example, when the first predetermined number is 10, the first threshold can be set to 3. In such a case, in the exemplary embodiment of the user login record list 211 as shown in Table 1, the frequently-used login location determiner 203 may determine that 'Beijing' and 'Baoding' are the frequently-used login locations.

The abnormal login record marker 205 may mark the user login records with different login location from the frequently-used login location as abnormal. For example, in the embodiment shown in Table 1, the abnormal login record marker 250 can mark the login record with the login location of 'Changsha' as abnormal.

It should be noted that as mentioned above, in some cases, the login location of the login record possibly cannot be obtained, and then the login location may be set to be 'unknown' in the user login record list. For such a login record with an unknown login location, the login record deleter 209 may be used to delete it from the user login record list 211. Thus, when the frequently-used login location determiner 203 determines the frequently-used login location and when the abnormal login record marker 205 marks an abnormal user login record, it is allowed not to take these user login records with unknown login locations into account. In another embodiment, it is also allowed to leave these user login records with unknown login locations in the user login record list 211, but these login records are not taken into account in the operations of the frequently-used login location determiner 203 and the abnormal login record marker 205. At this time, the login record deleter 209 may be omitted from the user login monitoring device 200.

The abnormal user login record may be taken out from the user login record list 211 and be marked by using the user login monitoring device 200 described hereinbefore. Subsequently, the user may also be informed and warned by a variety of means of communication, such as text messages, e-mail and the like when an abnormal login record appears.

Nevertheless, the inventors of the application have found that a better technical effect may be achieved, for example, the possibility and frequency of errors in marking or alarming may be greatly reduced by further improving the solution mentioned above.

An improvement is a special processing mode provided mainly for users who migrate frequently. Some users, such as people doing business in cities all over the country or people who tour in a plurality of cities in a period of time, will migrate frequently from one geographical position to another due to their occupation or needs in personal life, and will log on to the network application system in the process. For such users who migrate frequently, an exemplary embodiment of the corresponding user login record list 211 is as shown in Table 2.

TABLE 2

| Login Location | Login Time | Operation |
|---|---|---|
| Beijing (125.33.50.*) | 2012-07-04 10:52:24 | Ignoring this record |
| Beijing (125.33.50.*) | 2012-07-04 14:22:22 | Ignoring this record |
| Baoding (101.7.243.*) | 2012-07-05 10:17:19 | Ignoring this record |
| Baoding (101.7.243.*) | 2012-07-05 17:01:29 | Ignoring this record |
| Taiyuan (218.26.120.*) | 2012-07-06 10:17:19 | Ignoring this record |
| Taiyuan (218.26.120.*) | 2012-07-06 11:08:58 | Ignoring this record |
| Taiyuan (218.26.120.*) | 2012-07-06 17:01:29 | Ignoring this record |
| Changsha (220.240.88.*) | 2012-07-08 13:43:34 | Ignoring this record |
| Changsha (220.240.88.*) | 2012-07-08 22:01:00 | Ignoring this record |
| Beijing (111.193.195.*) | 2012-07-10 09:12:02 | Ignoring this record |

For the user login record list 211 as shown in Table 2, if the aforementioned general processing mode is taken, 'Beijing' and 'Taiyuan' will be determined as the frequently-used login locations, but the login records corresponding to the login locations 'Baoding' and 'Changsha' will be marked as abnormal. For people who migrate frequently from one geographical position to another, their login records may often be marked as abnormal, and will be frequently informed that there is an abnormal login, which is obviously not a good user experience. Therefore, the frequently-used login location determiner 203 may be configured to determine all the login locations to be the frequently-used login locations of the user when the number of the different login locations in the user login records in the user login record list 211 is not less than a second threshold. In one embodiment, the second threshold may be set to be about 40% of the first predetermined number. For example, when the first predetermined number is 10, the second threshold can be set to 4. In such a case, in the exemplary embodiment of the user login record list 211 as shown in Table 2, since there are four different login locations, namely 'Beijing', 'Baoding', 'Taiyuan' and 'Changsha', 'Baoding' and 'Changsha' are also determined as frequently-used login locations by the frequently-used login location determiner 203 in addition to 'Beijing' and 'Taiyuan'. Thus, when the abnormal login record marker 205 operates, all of the login records in the login record list 211 for the user will not be marked as abnormal. By testing and calculating, the rate of errors in marking and in alarming may be reduced by 50% in such a processing mode.

Another improvement is a special processing mode for users who usually use a network of which the login location is unable to be determined. For some users, since their frequently-used network is likely connected to the external network through the virtual private network (VPN) or due to other reasons, when a user logs on to the network application system 130 by using his frequently-used network, the login location mapper 207 of the user login monitoring device 200 or the network application system 130 cannot obtain his login location. For such a user, an exemplary embodiment of his corresponding user login record list 211 is as shown in Table 3. Since the login location to which the frequently-used network corresponds cannot be acquired, a large number of login records corresponding to the unknown address exist in the user login record list 211 as shown in Table 3.

TABLE 3

| Login Location | Login Time | Operation |
| --- | --- | --- |
| Unknown | 2012-07-04 10:52:24 | Ignoring this record |
| Changsha (220.240.88.*) | 2012-07-04 14:22:22 | Ignoring this record |
| Changsha (220.240.88.*) | 2012-07-04 22:01:00 | Ignoring this record |
| Unknown | 2012-07-05 09:12:02 | Ignoring this record |
| Unknown | 2012-07-06 10:17:19 | Ignoring this record |
| Unknown | 2012-07-06 11:08:58 | Ignoring this record |
| Unknown | 2012-07-06 17:01:29 | Ignoring this record |
| Changsha (220.240.88.*) | 2012-07-08 04:32:55 | Ignoring this record |
| Unknown | 2012-07-08 10:13:37 | Ignoring this record |
| Unknown | 2012-07-08 13:43:34 | Ignoring this record |

For the user login record list 211 as shown in Table 3, if the aforementioned general processing mode is taken, then 'Changsha' will be determined as the frequently-used login location, and then the login records corresponding to the login address of 'Changsha' will not be marked as abnormal. However, in fact, it is very likely that the real frequently-used login location of the user is hidden in the unknown address, whereas the login records with the login location of 'Changsha' is very likely abnormal. Therefore, the abnormal login record marker 205 may also be configured to mark the user login record with different login location from the user registration place as abnormal when the number of user login records, after each user login record with the unknown login location is deleted from the user login record list 211, is not greater than a third threshold. Accordingly, the user registration place may be a place registered by the user himself when the user makes the user registration in the network application system 130. In one embodiment, the third threshold may be set to be about 40% of the first predetermined number. For example, when the first predetermined number is 10, the third threshold can be set to 4. In such a case, in the exemplary embodiment of the user login record list 211 as shown in Table 3, since the number of user login records is only 3 after the user login records with unknown login address are removed, it is less than the third threshold. At this time, if the login location 'Changsha' in the remaining user login records is just the user registration place, then the abnormal login record marker 205 does not mark the user login records as abnormal, but if it is not the user registration place (for example, the user registration place is 'Beijing'), then the user login records corresponding to the login location 'Changsha' are marked as abnormal. In this way, the rate of recognizing the abnormal login record may be increased in the case where abnormality exists in the user's frequently-used network.

Figure 3:
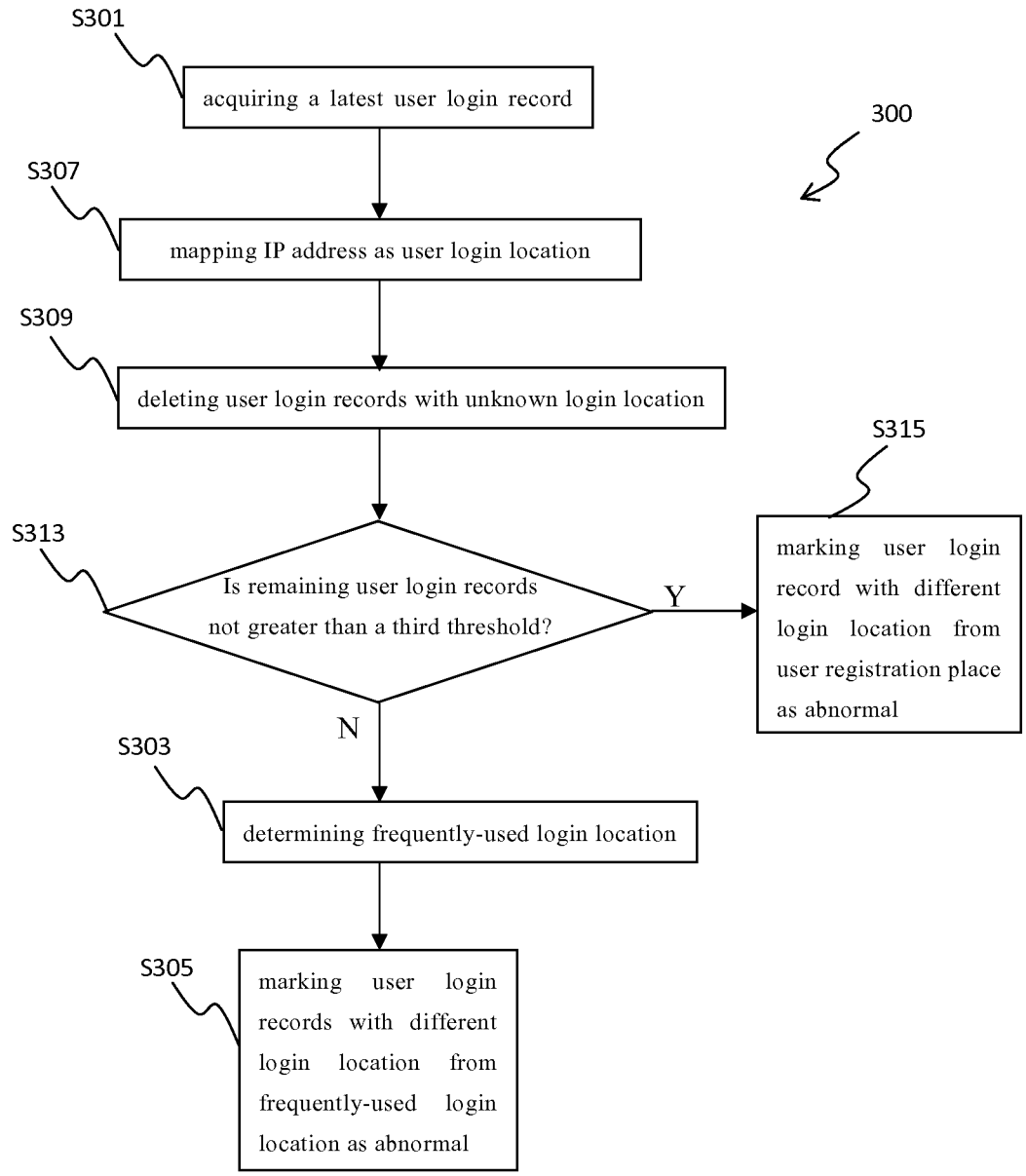
FIG. 3 schematically shows a flow diagram of an embodiment of the user login monitoring method according to the present invention.

FIG. 3 schematically shows a flow diagram of an embodiment of the user login detection method according to the present invention. The user login detection method 300 is suitable for execution in the abovementioned user login detection device 200.

This method may begin at step S301 to acquire the latest user login record list of the user. The user login record list may include a first predetermined number of user login records, and each user login record includes information associated with the login location of the user. In step S301, the user login record list 211 may be acquired by the login record fetcher 201 in the user login monitoring device 200 as shown in FIG. 2.

When the information associated with the login location of the user within the user login record acquired in step S301 is the IP address used when the user logs in, the method 300 may go to step S307 to map the IP address used when the user logs in as the login location of the user. Step 307 can be executed by the login location mapper 207 in the user login monitoring device 200 as shown in FIG. 2. When the user login record acquired in step S301 has directly contained the login location, step S307 may also be omitted. When the login location of the user cannot be acquired, for example when the IP address when the user logs in cannot be mapped as a login location of the user, the login location in the user login record may be set to be 'unknown'.

Subsequently, the method 300 may go to step S309 to delete the user login records with the unknown login location from the user login record list 211. As described hereinafter, the user login record with the unknown login location is deleted mainly to facilitate the determining and marking in subsequent steps. In another embodiment, these user login records with the unknown login location may also be reserved in the user login record list 211, whereas these login records are not taken into account in subsequent steps, thus step S309 can also be omitted. Step S309 may be executed by the login record deleter 209 in the user login monitoring device 200 as shown in FIG. 2.

Optionally, the method 300 may go to step S313 to determine whether the number of user login records is not greater than a third threshold after the user login record with unknown login location is deleted from the user login record list 211 or is not taken into account. If yes, step S315 is entered to mark the user login record with a different login location from the user registration place as abnormal; otherwise, step S303 is entered. The user registration place may be a place registered by the user himself when the user makes a user registration in the network application system 130. The steps S313 and S315 may be executed by the login record marker 205 in the user login monitoring device 200 as shown in FIG. 2. As illustrated hereinbefore when the user login monitoring device 200 is described, such a processing mode is mainly for the special case to the user who uses the frequently-used network with the login location unable to be determined. When such a special case is not taken into account, steps S313 and S315 may also be omitted.

Subsequently, the method 300 may go to step S303 to determine the frequently-used login location of the user based on the user login record list 211. Accordingly, the user login records with a same login location in the user login record list 211 may be collected and analyzed statistically, and when the number of the user login records with the same login location is not less than a first threshold, the login location associated with the login records of the user is determined as the frequently-used login location of the user.

Alternatively, in step S303, when the number of different login locations in the user login records in the user login record list 211 is not less than a second threshold, all of the login locations are determined as the frequently-used login locations of the user. As illustrated hereinbefore when the user login monitoring device 200 is described, such a processing mode is mainly for the special users who migrate frequently. When such a special case is not taken into account, such a processing mode may also be omitted in step S303. It should be noted that in the case when step S309 is omitted, the unknown login location is not included or taken into account in all of the login locations here.

Step S303 may be executed by the frequently-used login location determiner 203 in the user login monitoring device 200 as shown in FIG. 2.

Finally, the method 300 may go to step S305 to mark the user login records with a different login location from the frequently-used login location as abnormal. It should also be noted that in the case when step S309 is omitted, the user login records which the unknown login location corresponds to is also not taken into account or not marked in step S305. Step S305 may be executed by the login record marker 205 in the user login monitoring device 200 as shown in FIG. 2.

Similarly as described for the user login monitoring device 200 in connection with FIG. 2, the first threshold may be about 30% of the first predetermined number, the second threshold may be about 40% of the first predetermined number, and/or the third threshold may be about 40% of the first predetermined number. Accordingly, the first predetermined number may be 10 for example.

Each member embodiment of the present invention may be implemented in hardware, or in the software modules running on one or more processors, or in a combination thereof. Those skilled in the art should appreciate that the use of a microprocessor or digital signal processor (DSP) in practice to implement some or all of the functions of some or all of the components in the device according to the embodiments of the present invention is allowed. The present invention may also be implemented as programs of a devices or apparatus (e.g., computer programs and computer program products) for carrying out a part or all of the methods described herein. Such programs embodying the present invention may be stored on a computer readable medium, or may be in the form of one or more signals. Such a signal can be downloaded from the Internet site, or provided on a carrier signal, or provided in any other forms.

Figure 4:
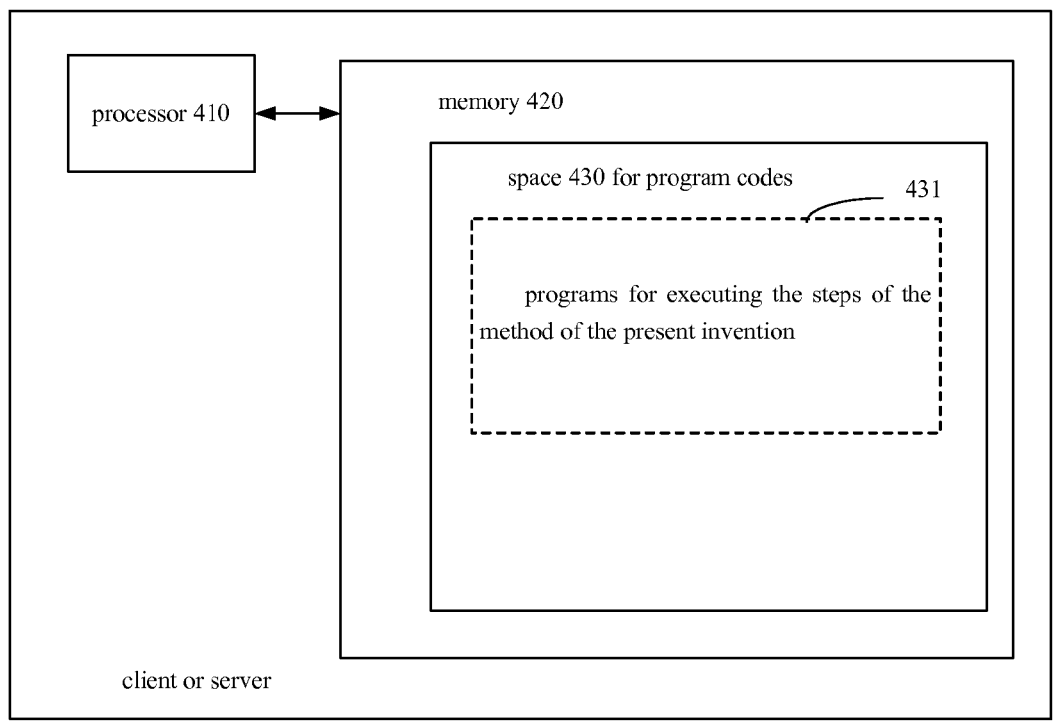
FIG. 4 schematically shows a block diagram of a client or server for executing the method according to the present invention in an embodiment of the present invention.
Figure 5:
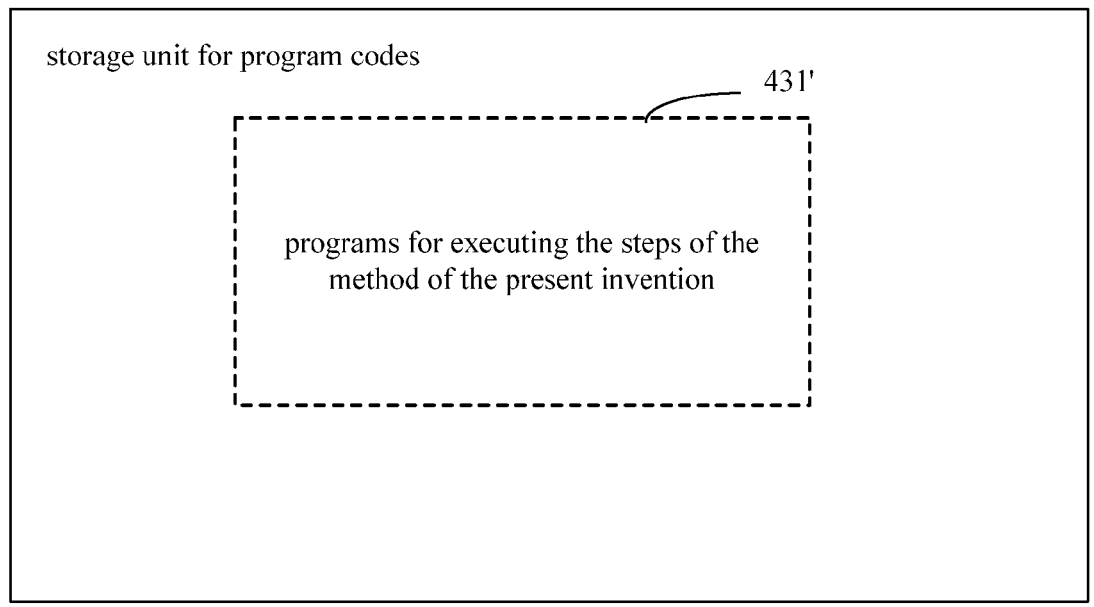
FIG. 5 schematically shows a storage unit for holding or carrying a program code for implementing the method according to the present invention in an embodiment of the present invention.

For example, FIG. 4 shows a client or server for implementing the method or device according to the present invention. The client or server includes conventionally a processor 410 and a computer program product or computer readable media in the form of a memory 420. The memory 420 may be electronic memories such as flash memory, EEPROM (Electrically Erasable Programmable Read Only Memory), EPROM, a hard disk or an ROM. The memory 420 has the storage space 430 for a program code 431 for performing any of the steps in the above-described method. For example, the storage space 430 for the program code may include program codes 431 respectively for implementing steps of the above method. These program codes can be read from or written to one or more computer program products. These computer program products include program code carriers such as hard disks, compact disks (CD), memory cards or diskettes. Such a computer program product is typically a portable or fixed storage unit as described with reference to FIG. 5. The storage unit may have a storage section, storage space or the like arranged similar to the memory 420 in the client or server shown in FIG. 4. The program code may for example be compressed in a suitable manner. Typically, the storage unit includes a computer-readable code 431', which can be read by a processor, for example, the processor 410 and the like, when executed by the server, the codes lead the server to perform the method described in the above steps.

The algorithm and display provided herein are not inherently related to any particular computer, virtual system or other devices. Various general-purpose systems may also be used with the teaching based on this. According to the above description, structure required for such a system is obvious. Furthermore, the present invention is not specific to any particular programming language. It should be understood that the content of the present invention may be realized by using a variety of programming languages and the above description is made to a specific language for disclosure of the preferred embodiment of the present invention.

Reference herein to 'an embodiment', 'embodiments' or 'one or more embodiments' means that a particular feature, structure, or characteristic described in connection with the embodiment is included in at least one embodiment of the present invention. Also, it should be noted that, here, 'in an embodiment' is not necessarily referring to the same embodiment.

In the description provided herein, numerous specific details are described. However, it is understood that embodiments of the present invention may be practiced without these specific details. In some examples, the known methods, structures and techniques are not shown in detail, so as not to obscure the understanding of this description.

It should be noted that the above-described embodiments of the present invention will be described and not to limit the invention, and that those skilled in the art without departing from the scope of the appended claims may devise alternative embodiments. In the claims, any reference signs placed between parentheses should not be configured to restrict the claims. The word 'comprising' does not exclude the presence of elements or steps not listed in the claims. The word 'a' or 'an' located before element does not exclude the presence of a plurality of such elements. The present invention may be achieved by means of hardware comprising several distinct elements, and by means of a suitably programmed computer. In the unit claim enumerating several means, several of these means may be embodied by the same item of hardware. The words first, second, and third and the like do not denote any order. These words can be interpreted as a name.

It should also be noted that the language used in this specification is selected primarily for the purposes of readability and teachings, instead of being selected in order to explain or define the subject of the present invention. Therefore, without departing from the scope and spirit of the appended claims, for the person of ordinary skill in the art, many modifications and variations are obvious. For the scope of the present invention, the disclosure of the present invention is made to be illustrative, and not restrictive, and the scope of the present invention is defined by the appended claims.

The invention claimed is:

1. A device for identifying an abnormal login record, comprising:
   a processor; and
   a memory communicatively coupled to the processor and storing instructions that upon execution by the processor cause the device to:
   acquire a user login record list associated with a user, wherein the user login record list comprises a predetermined number of user login records, and the predetermined number of user login records each comprise a corresponding IP addresses from which the user logs in;
   identify a login location associated with the user that corresponds to a user login record among the predetermined number of user login records based on an IP address corresponding to the user login record among the predetermined number of user login records;
   remove a first user login record from the predetermined number of user login records in response to a determination that a corresponding login location associated with the user cannot be identified based on a corresponding IP address;

after removing, determine whether a number of remaining user login records among the predetermined number of user login records is greater than a predetermined threshold;

in response to a determination that the number of the remaining user login records is greater than the predetermined threshold, determine a frequently-used login location associated with the user based on the remaining user login records, wherein a number of user login records among the remaining user login records that correspond to the frequently-used login location is not less than a first threshold;

identify a second user login record among the remaining login records as an abnormal login record, wherein the second user login record corresponds to a login location that is different from the frequently-used login location;

in response to a determination that the number of the remaining user login records is not greater than the predetermined threshold, obtain a registration location associated with the user, wherein the registration location associated with the user is a location recorded by the user in a registration process; and identify a third user login record among the remaining login records as an abnormal login record, wherein the third user login record corresponds to a login location that is different from the registration location, wherein the predetermined number is an integer greater than zero, and both the predetermined threshold and the first threshold are integers greater than zero but less than the predetermined number.

2. The device of claim 1, wherein the memory further storing instructions that upon execution by the processor cause the device to identify a plurality of login locations corresponding to the remaining user login records as a plurality of frequently-used login locations associated with the user in response to a determination that a number that each of the plurality of login locations appears is not less than a second threshold.

3. The device of claim 1, wherein the first threshold is 30% of the predetermined number.

4. The device of claim 1, wherein the second threshold is 40% of the predetermined number.

5. The device of claim 1, wherein the predetermined threshold is 40% of the predetermined number.

6. The device of claim 1, wherein the predetermined number is 10.

7. The device of claim 1, wherein a unit of the login location is 'city'.

8. A method for identifying an abnormal login record, comprising steps of:

acquiring a user login record list associated with a user, wherein the user login record list comprises a predetermined number of the user login records, and the predetermined number of user login records each comprises a corresponding IP address from which the user logs in;

identifying a login location associated with the user that corresponds to a user login record among the predetermined number of user login records based on an IP address corresponding to the user login record among the predetermined number of user login records;

removing a first user login record from the predetermined number of user login records in response to a determination that a corresponding login location associated with the user cannot be identified based on a corresponding IP address;

after removing, determining whether a number of remaining user login records among the predetermined number of user login records is greater than a predetermined threshold;

in response to a determination that the number of the remaining user login records is greater than the predetermined threshold, determining a frequently-used login location associated with the user based on the remaining user login records, wherein a number of user login records among the remaining user login records that correspond to the frequently-used login location is not less than a first threshold;

identifying a second user login record among the remaining login records with a corresponding login location that is different from the frequently-used login location as an abnormal login record;

in response to a determination that the number of the remaining user login records is not greater than the predetermined threshold, obtaining a registration location associated with the user, wherein the registration location associated with the user is a location recorded by the user in a registration process; and identifying a third user login record among the remaining login records with a corresponding login location that is different from the registration location as an abnormal login record, wherein the predetermined number is an integer greater than zero, and both the predetermined threshold and the first threshold are integers greater than zero but less than the predetermined number.

9. The method of claim 8, further comprising:

in response to a determination that a number that each of a plurality of login locations corresponding to the remaining user login records is identified is not less than a second threshold, identifying the plurality of the login locations corresponding to the remaining user login records as a plurality of frequently-used login locations associated with the user.

10. The method of claim 8, wherein the first threshold is 30% of the predetermined number.

11. The method of claim 8, wherein the second threshold is 40% of the predetermined number.

12. The method of claim 8, wherein the predetermined threshold is 40% of the predetermined number.

13. The method of claim 8, wherein the first predetermined number is 10.

14. The method of claim 8, wherein a unit of the login location is 'city'.

15. A non-transitory computer readable medium having instructions stored thereon that, when executed by at least one processor, cause the at least one processor to perform a method comprising steps of:

acquiring a user login record list associated with a user, wherein the user login record list comprises a predetermined number of the user login records, and the predetermined number of user login records each comprise a corresponding IP address from which the user logs in;

identifying a login location associated with the user that corresponds to a user login record among the predetermined number of user login records based on an IP address corresponding to the user login record among the predetermined number of user login records;

removing, a first user login record from the predetermined number of user login records in response to a determination that a corresponding login location associated with the user cannot be identified based on a corresponding IP address;

after removing, determining whether a number of remaining user login records among the predetermined number of user login records is greater than a predetermined threshold;

in response to a determination that the number of the remaining user login records is greater than the predetermined threshold, determining a frequently-used login location associated with the user based on the remaining user login records, wherein a number of the user login records among the remaining user login records that correspond to the frequently-used login location is not less than a first threshold;

identifying a second user login record among the remaining login records as an abnormal login record, wherein the second user login record corresponds to a login location that is different from the frequently-used login location;

in response to a determination that the number of the remaining user login records is not greater than the predetermined threshold, obtaining a registration location associated with the user, wherein the registration location associated with the user is a location recorded by the user in a registration process; and identifying a third user login record among the remaining login records as an abnormal login record, wherein the third user login record corresponds to a login location that is different from the registration location, wherein the predetermined number is an integer greater than zero, and both the predetermined threshold and the first threshold are integers greater than zero but less than the predetermined number.

* * * * *